US009928102B2

(12) United States Patent
Majumdar et al.

(10) Patent No.: US 9,928,102 B2
(45) Date of Patent: Mar. 27, 2018

(54) METHOD AND APPARATUS FOR RANDOMIZING COMPUTER INSTRUCTION SETS, MEMORY REGISTERS AND POINTERS

(71) Applicant: KYNDI, INC., Redwood City, CA (US)

(72) Inventors: Arun Majumdar, Alexandria, VA (US); Martin Shafer Ramsey, Westminster, MD (US)

( * ) Notice: Subject to any disclaimer, the term of this patent is extended or adjusted under 35 U.S.C. 154(b) by 152 days.

(21) Appl. No.: 14/971,647

(22) Filed: Dec. 16, 2015

(65) Prior Publication Data

US 2016/0171212 A1 Jun. 16, 2016

Related U.S. Application Data

(60) Provisional application No. 62/092,570, filed on Dec. 16, 2014.

(51) Int. Cl.
| | |
|---|---|
| G06F 21/00 | (2013.01) |
| G06F 9/455 | (2018.01) |
| G06F 21/71 | (2013.01) |
| G06F 9/30 | (2018.01) |

(52) U.S. Cl.
CPC ...... *G06F 9/45558* (2013.01); *G06F 9/30178* (2013.01); *G06F 21/71* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| 6,516,436 B1 | 2/2003 | Dave et al. | |
|---|---|---|---|
| 2002/0046092 A1* | 4/2002 | Ostroff | G06Q 20/06 705/14.26 |
| 2006/0294238 A1* | 12/2006 | Naik | G06F 9/5072 709/226 |
| 2007/0083770 A1 | 4/2007 | Heasman et al. | |
| 2011/0035601 A1 | 2/2011 | Davidson et al. | |
| 2013/0007469 A1* | 1/2013 | Aratsu | G06F 21/53 713/190 |

FOREIGN PATENT DOCUMENTS

WO  WO 2014/145965 A1  9/2014

OTHER PUBLICATIONS

Van Wijngaarden grammars and metamorphism, 2011 Sixth International Conference on Availability, Reliability and Security, pp. 466-472, Oct. 17, 2011.*
International Search Report and Written Opinion dated Feb. 26, 2016 in PCT/US15/66080 filed Dec. 16, 2015.

* cited by examiner

*Primary Examiner* — David Le

(57) ABSTRACT

Described herein is a method and apparatus to randomize instruction sets, memory registers, and pointers to increase computer security by increasing resource commitment requirements for malicious software, malicious computer users, or reverse engineers to understand the meaning of the new instruction sets, memory registers, and pointers.

33 Claims, 5 Drawing Sheets

METHOD AND APPARATUS FOR RANDOMIZING COMPUTER INSTRUCTION SETS, MEMORY REGISTERS AND POINTERS

CROSS-REFERENCE TO RELATED APPLICATIONS

This application is based upon and claims the benefit of priority to provisional U.S. Application No. 62/092,570, filed Dec. 16, 2014, the entire contents of which are incorporated herein by reference.

BACKGROUND

Field of Disclosure

Embodiments described herein generally relate to a framework for randomizing instruction sets, memory registers, and pointers of a computing system.

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Instruction sets, memory registers, and pointers that are used in most computing systems are fairly standardized. Standardized machine instruction sets provide consistent interfaces between software and hardware, but they are a double-edged sword. Although they yield great productivity gains by enabling independent development of hardware and software, the ubiquity of well-known instructions sets also allows a single attack designed around an exploitable software flaw to gain control of thousands or millions of systems. Accordingly, having a standardized instruction set facilitates intellectual property theft, computer exploitation, hacking and the like.

Address space layout randomization (ASLR) is a memory-protection process for operating systems (OSes) that guard against buffer-overflow attacks by randomizing the location where system executables are loaded into memory. While ASLR is a practice to randomize instruction addresses in library code, and is a form of ontology encoding that thwarts library injection code attacks, ASLR does not address the challenges faced by a cloud application that is based on binary code static instruction addresses.

Accordingly, a technique is required to address the above stated deficiencies in the art and to further provide software protection such that code cannot be decrypted or attacked by side-channels.

SUMMARY

Computer systems utilize standardized instruction sets and, to a lesser extent, memory registers and pointers, regardless of the chip sets used. Such an industry standard help promote software development. An aspect of the present disclosure provides for the randomization of instruction sets, memory registers, and pointers thereby providing security against reverse engineering, side-channel intercept and analysis, and other methods of data analysis. An aspect of the present disclosure provides for randomizing instruction sets, memory registers and pointers without requiring changes in software development, neither in chip set design nor manufacturing. Accordingly, the security techniques described herein overcome technological limitations in both randomization and key index management.

An aspect of the present disclosure provides for a method and apparatus for software protection such that software code cannot be decrypted or attacked by side-channels. Furthermore, by one embodiment, the present disclosure overcomes the limitations associated with standardized instruction sets, memory registers and pointers by introducing a notion of randomness in their respective generations. Furthermore the present disclosure provides an improvement over typical run-time per call dispatch decryption, wherein typically the body of the code remains encrypted in that it leverages, among other things, new discoveries in the field of Full Ontological Encryption (FOE), artificial intelligence, machine learning, networks of semi-autonomous agents, Self-Modifying Instruction Randomization Code (SMIRC), and Semantic Dictionary Encryption (SDE).

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
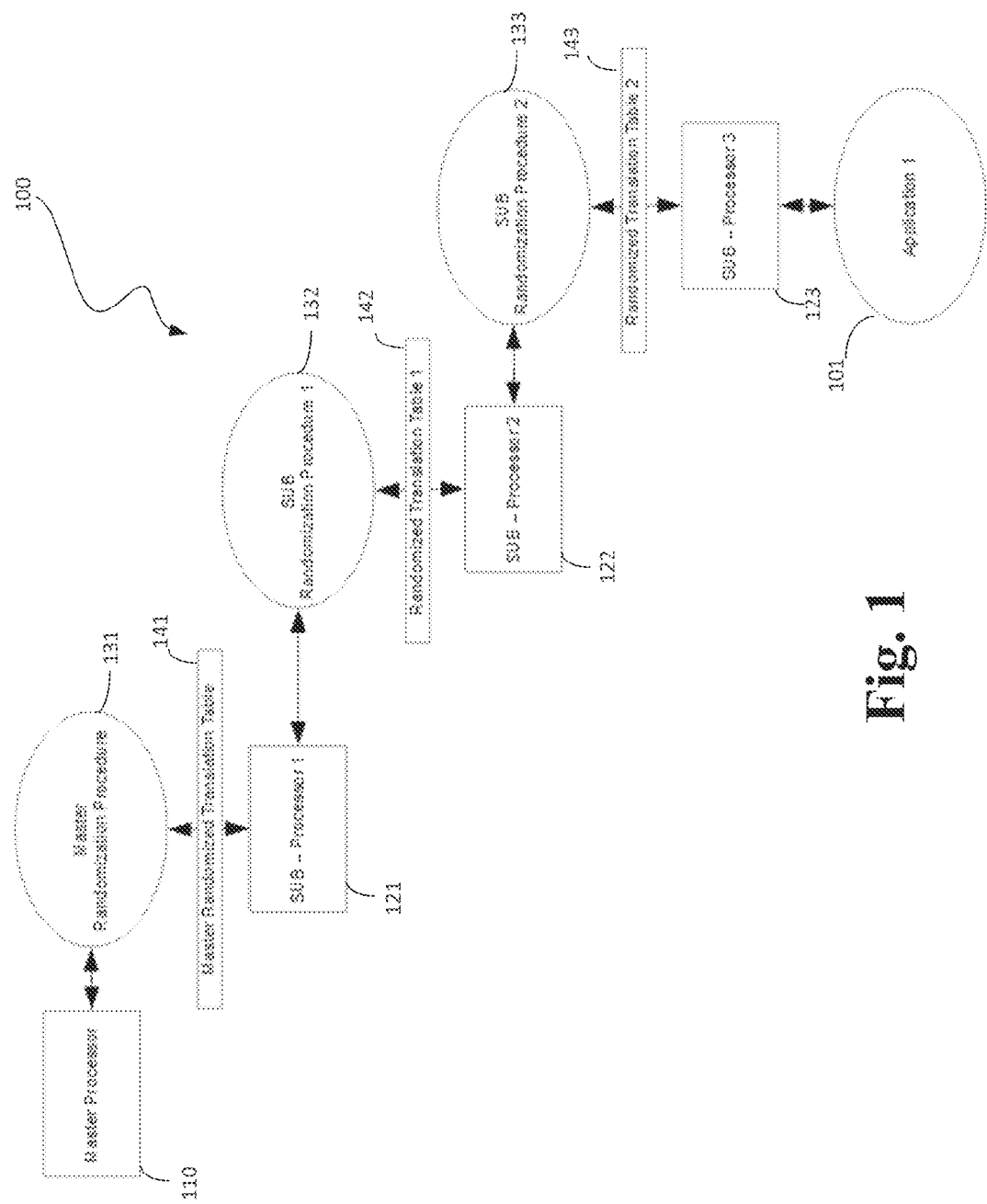
FIG. 1 illustrates according to one embodiment, an exemplary hierarchy of processes.

Referring now to the drawings, wherein like reference numerals designate identical or corresponding parts throughout the several views. Accordingly, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Turning to FIG. 1 is depicted an exemplary interlocking set of processors. By one embodiment, an application program can be divided into various jobs, referred to herein as sub-routines or tasks. Each of the tasks can be distributed by a master processor to a subordinate processor. The subordinate processor thereafter may elect to become its own master processor, and further subdivide the task assigned to it into various sub-tasks and assign each of the sub-tasks to its subordinate processors. Thus, in this manner, the program may be divided into many different tasks, with each task assigned to a subordinate processor. It must be appreciated that each subordinate processor is a master processor with regard to the processors to whom the subordinate processor assigns tasks. Thus, the execution of the program may be considered to be performed by a hierarchy of processors as shown in FIG. 1.

Grammars are used to describe sentence structures based on a set of rules, which depend on the type of grammar being implemented. For instance, a context-free grammar (CFG) is a set of recursive rewriting rules (or productions) that are used to generate patterns of strings. A CFG includes the following components: a set of terminal symbols, which are the characters of the alphabet that appear in the strings generated by the grammar; a set of nonterminal symbols, which are placeholders for patterns of terminal symbols that can be generated by the nonterminal symbols; a set of productions, which are rules for replacing (or rewriting) nonterminal symbols (on the left side of the production) in a string with other nonterminal or terminal symbols (on the right side of the production); and a start symbol, which is a special nonterminal symbol that appears in the initial string generated by the grammar.

By one embodiment of the present disclosure, a master processor creates a hierarchy of processors that execute an application program. Specifically, as stated previously, a master processor creates a random number of sub-processes. Each sub-processor in turn, may act as a master processor and create its own sub-processes. Each of the sub-processors is assigned a unique random instruction set, memory registers and pointers by its master processor. By one embodiment, grammars may be used to determine a randomized instruction set, memory registers and pointers for each sub-processor. In doing so, the present disclosure incurs the advantageous ability of providing a security mechanism against potential exploitation threats to the program.

Accordingly, the attempts by malicious software programs or reverse engineering techniques made to exploit the vulnerabilities of the program are prevented. Specifically, due to the number of processors that are used to execute the program are random, and the instruction set assigned to each processor is determined in a random manner (based on the Grammar), current and future reverse engineering programs have no mechanism of acquiring the translation table for the instruction set, or the locations of pointers and memory registers.

Furthermore, as an added layer of security, each time the application is turned on, a new translation table is provided by a higher-layer processor and attempts to compromise the processor fail because the various running applications within the processor will not adhere to standardized instruction sets, memory registers or pointers. Thus, by one embodiment, the number of processors used will be random and as such the reverse engineer or malicious software will not know how many times it must attempt to break out of each processor, and the attempt to break out of the processor will cause the supervising processor to shut down the sub-processor and reboot it, with an entirely new randomized instruction set, memory registers and pointers.

By one embodiment of the present disclosure, Van Wijngaarden (VW) grammar is used to create a random instruction set, memory registers, and pointers that are assigned to each sub-processor. VW grammar can be visualized as a composition of two context-free grammars (i.e., the VW is a two-level grammar). The first context-free grammar is used to generate a set of terminal symbols which acts as non-terminals for the second context-free grammar.

Ontology encryption is a cypher system that obscures the content of data in such a way that operations can be performed on specific elements of the data without revealing the contents of those elements. Homomorphic encryption techniques rely on homomorphsims, which can be defined as a data map which preserves structure of data groups, in other words it shifts data relative to a single grammar. In contrast, ontology encryption is different as it shifts data relative to multiple grammars. Specifically, by one embodiment of the present disclosure, data may be shifted within a single grammar, within a two-layer grammar (VW grammar) and/ or within M of N grammars. M of N grammars can be parallel, serial, or cascading. Accordingly, ontology encryption can occur by using many methods and embodiments of the present disclosure can incorporate and leverage all forms of ontology encryption.

FIG. 1 depicts a non-limiting example illustrating a hierarchy of processors 100. As shown in FIG. 1, an application program 101 is executed in a hierarchy of three levels of processors. The hierarchical series of processors 100 includes a master processor 110 that controls sub-processors 121, 122, and 123. Each processor is allocated a randomized instruction set, memory pointers, and registers that enable securing, data, instruction set, memory pointers and registers from an adversary attempting to reverse engineer, understand, or cause the processor to perform unauthorized procedures or assist the adversary in a manner the adversary chooses.

As shown in FIG. 1, the master processor 110 implements a master randomization process 131 (i.e., creating a grammar) to generate a translation table 141 (translation table of instruction sets) that assigns a randomized instruction set, memory registers and pointers to the first sub-processor 121. In a similar manner, the sub-processor 121 may act as its own master processor and assign a portion or all of the tasks assigned to it by the master processor 110, to a second sub-processor 122. In doing so, the sub-processor 121 also allocates a randomized instruction set, memory registers, and pointers (by implementing sub-randomization process 132) to generate a translation table 142 for the second sub-processor 122.

Furthermore, the second sub-processor 122 may implement a sub-randomization process (i.e., creating grammar based on VW grammar) to assign a randomized instruction set, memory registers, and pointers to a third sub-processor 123, via the third translation table 143. Moreover, it must be appreciated that although the illustration as depicted in FIG. 1 includes only three levels (iterations) of sub-processor creation, the techniques described herein are applicable to any number of hierarchical processors.

In FIG. 1, each sub-processor is provided a randomized instruction set, memory register, and pointers by its managing processor that controls it. For instance, instead of being required to add X+Y, the sub-processor would be tasked with adding Z mod X with A mod Y. It is the task of the controlling processor (i.e., the managing processor/master processor of the sub-processor) to know the true algorithm, and when provided with an answer (by the sub-processor) to apply the algorithm (translation) to derive the correct solution. Thus, in this manner, each processor will process only portions of the program, and each of those portions of the program will have gone through several obfuscation steps. Additionally, by one embodiment, each time the corresponding portion of the program is run, it may be executed on a different processor, in a different virtual machine. Specifically, due to the randomness in determining the number of processors to use in execution of a particular program, each portion of the program may be executed on different processors during each execution iteration of the application.

In this manner, an adversary will be challenged to know the exact data that is being processed at a particular time instant, and also where the full program resides. Furthermore, the adversary will not know where the unencrypted data resides (instruction set, memory pointer, or register) or even the layer of obfuscation that the adversary is examining at that moment, or at which layer does the master processor create the master translation table and stores the method of key management and randomization for the processors immediately under its control.

Furthermore, as each processor activates a sub-processor under its temporary control, the processor injects randomization into the controlled processes and retains a generated master index for the processor. Accordingly, the overall program is more fully protected. The sub-processors controlled by the master processor are themselves in control of yet other sub-processors underneath them and act as master processors for those sub-processors. Thus, the program expands and retracts in a random manner with each expansion being assigned to a newly appointed master control processor. In this manner, the program maintains state, yet its location in the computer system is known only by itself and each part of it is contained in a protected stub state as the program expands throughout the computer system only to retract again, reformulate, assign a new master controller processor and repeat an expansion cycle.

An advantageous ability incurred in performing the randomization of the number of processors as well as randomizing the instruction sets, memory registers, and pointers is that a malicious software or reverse engineer would only be able to determine that the command being executed at a particular time instant is, for example, 2+2. An adversary seeing this command would not know if the number 2 is an encrypted and randomized number, if the addition instruction is indeed a true instruction, and neither would the adversary know which processor in the computer system is the current master control, sub-processor and the like.

Finally, the adversary would not know as to why this instruction set is being executed at a particular time instant. As the adversary attempts to compromise and analyze each processor in the computer system, the adversary will still not know how many processors are actually in the computer system, because the number of processors themselves is randomly chosen. Furthermore, by one embodiment, a random number of additional processors are introduced in order to create noise, which appears to be valid processing but is disregarded by the program.

Additionally, but the malicious software or reverse engineer would not know what the command 2+2 designates, as it has been translated by the master processor. Furthermore, the next time that command is run, it might appear as ⅝, as the master processor (of a particular sub-processor) randomizes the instruction set at each cycle of execution.

It must be appreciated that embodiments described herein are not limited to a single computer system but is also applicable to a networked computer system having distributed storage, and processing computer systems, and the like. Additionally, the above described embodiments are equally applicable to a distributed processing and storage systems, referred to as 'the cloud network'.

Moreover, whether leveraging distributed processing and storage systems, the process of the above described embodiments is still applicable, i.e., a random number of processors is chosen by the master processor and assigned to the temporary cluster of processors needed for the task. Such an M of N structure (i.e., random number of processors, each with a random number of processing cycles) further obfuscates the processes and data such that an adversary will not know how many processors he or she must examine to fully analyze the process and data. The master processor may assign tasks to each layer-1 processor, which in turn may create additional layers underneath it and act as a sub-master processor. Such a process continues until the cluster of processors is instructed to reconfigure itself with a new master processor and new layers.

Figure 2:
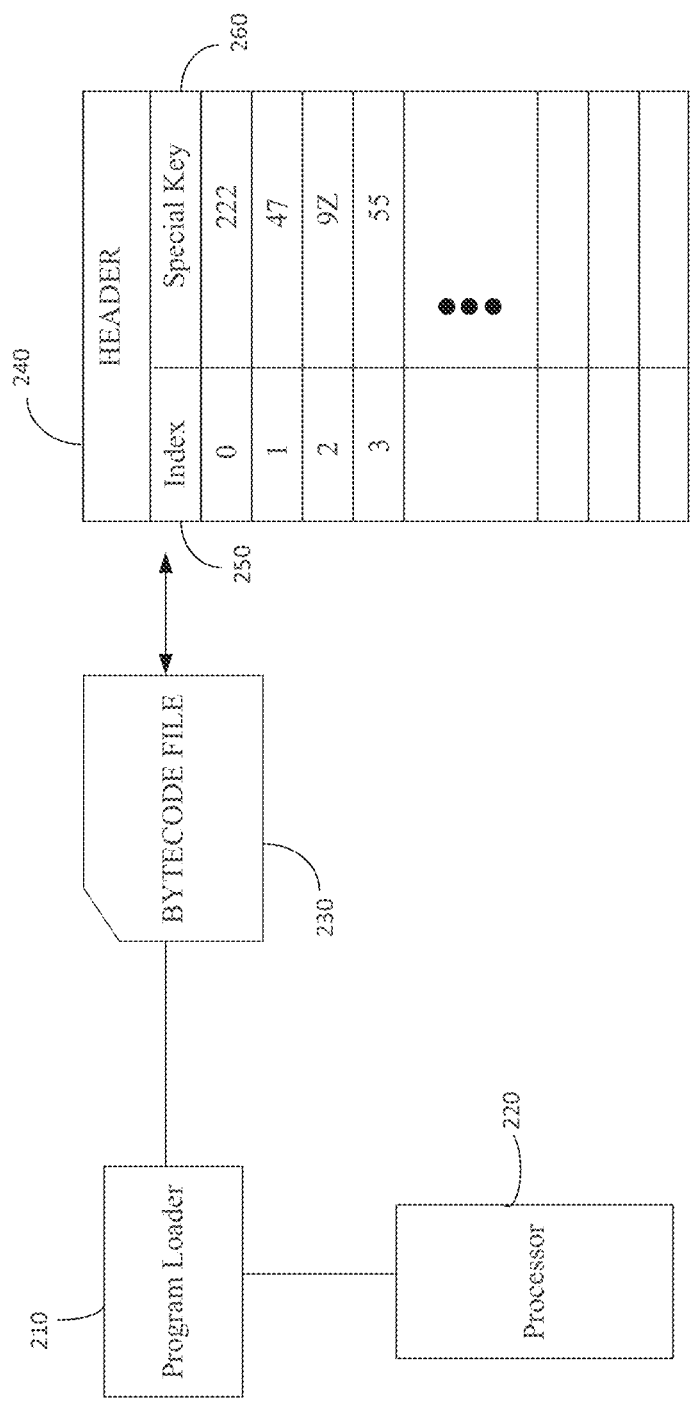
FIG. 2 illustrates an example depicting the randomization performed by a processor.

Turning now to FIG. 2 is illustrated a non-limiting example depicting the randomization process described in the above embodiments. FIG. 2 depicts an instance of a program loader 210 coupled to processor/virtual machine 220 and a bytecode file 230 that corresponds to a computer object code. The processing performed on the bytecode file 230 by a randomization process of the present disclosure is depicted in 240.

The loader 210 is a component that locates a given program (which can be an application or, in some cases, part of the operating system of the computer itself) in an offline storage (such as a hard disk), and loads it into a main storage (e.g., random access memory in a personal computer) for execution.

Further, the bytecode file 230 includes a computer object code that is processed by a program (e.g., a virtual machine). As shown in FIG. 2, the bytecode file includes a header and a sequence of indexes 250 for the instructions. For each index (corresponding to an instruction), by one embodiment of the present disclosure, a special key 260 (i.e., an opcode) is generated in a random manner. Note that the opcode generated for an instruction specifies an operation to be performed. Accordingly, by randomly generating an opcode for the instruction set, provisions the present disclosure to prevent malicious software or reverse engineers to track the exact execution of the application. In other words, the bytecode file is encrypted (in a random manner at run time) such that when the file is decrypted the runtime processing is rearranged.

By one embodiment of the present disclosure, the steps that each processor undertakes in the randomization process are as follows: 1) the binary code is transformed into an Self-Modifying-Instruction-Randomization-Code (SMIRC) and Semantic Dictionary Encryption (SDE) (i.e., a SMIRC+SDE) representation, 2) the SMIRC+SDE representation is further transformed into a Van Wijngaarden Grammar Synthesizer (VWGS), that generates via a write-back process a generator stub (block of instructions) the which creates a small binary executable. Note that the stub is protected via run-time per-call dispatch decryption while the body of code remains encrypted. The process may further regenerate the original application in binary form. Accordingly, a full ontology encryption is employed by the embodiments described herein via run-time randomization, at random times, of the binary using ontological encryption generated from the stub.

Cryptographic Protocol

The processing system (for example a virtual machine (VM)) is composed of two parts: an Outer Processing System (OPS) OPS host running on the real cpu hardware, and an inner, guest part running in an Inner Processing System (IPS) such as in a virtualized virtual machine container (i.e. like qemu). All information about the real identity of the user and the user's process (i.e computer) is maintained by the OPS. All application subroutines are run from the IPS. Writable access control is solely permitted by the IPS as a subordinate processor such as a virtual device provided by the OPS. Encryption runs on the OPS such that the inner machine does not have access to the key.

In this way the OPS functions as a Master Processor and the IPS functions as a Subordinate Processor (which can also function as a Master Processor for its own Subordinate Processors). The OPS, (for example an IPSOPS virtual machine image) is part of a host VM that houses the IPS (for example an inner OPS VM), so that each instance of an OPS appears identical in every way that can be seen from inside (i.e. user name, mac addresses, and IP addresses). The interface presented to the inner machine by the outer machine is always the same also; for example, the inner machine always refers to the outer machine using the same names.

The outer machine runs from a hypervisor, and all code that has to talk to the "real" network. The inner machine can only connect only to the allocated cryptographic port of the outer machine. The outer machine has a firewall configured such that no traffic can ever be relayed directly from the inner machine to the network. The only way the inner machine can talk to another processor should be through the port allocated by the outer machine.

There are two types of cryptography:
1. symmetric cryptography (such as RC4, RC5, SHA-1 and MD5) and
2. asymmetric cryptography (such as RSA and ECC).

Figure 4:
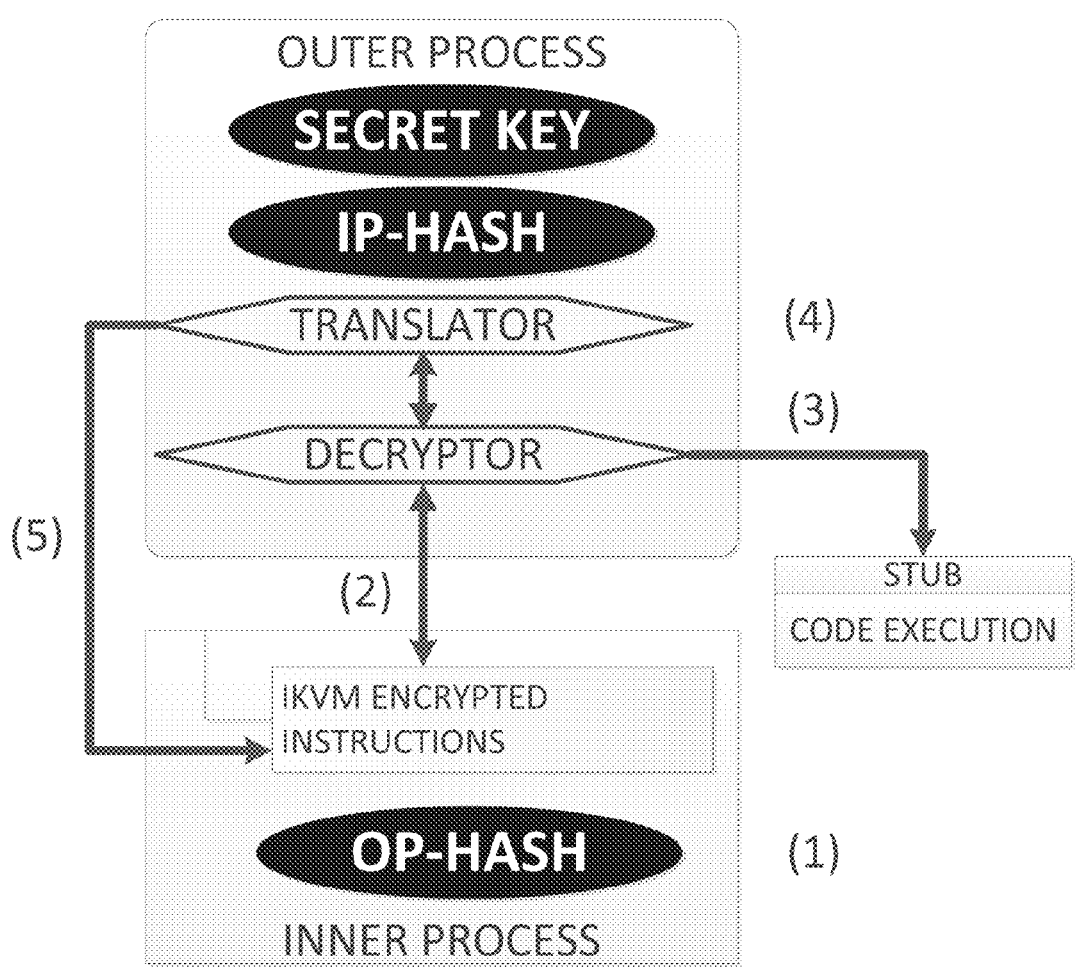
FIG. 4 illustrates one embodiment of the process according to the invention.

The OPS creates the SMIRC+SDE via cryptography mechanisms, as shown in FIG. 4. In this example the symmetric RC5 algorithm is used however any symmetric encryption algorithm may be used and adopted for communication between application subroutines (i.e. these are co-routines or resource constrained nodes running as a component of the master application). An asymmetric cryptography (such as the RSA algorithm), is applied for communication between OPS and IPS.

The two protection mechanisms execute within trusted emulators while remaining out-of-band of untrusted systems (i.e. the systems that are being emulated). The integrity and reliability of the system depends upon keeping attackers in sandboxes within the emulated environments. The OPS) and IPS) interact using the following rules:
1. OPS copies IPS instructions from IPS memory into OPS memory.
2. IPS instructions are translated to a set of OPS instructions. When this set of translated OPS instructions execute the state of IPS memory and registers is modified such that it appears as if the original IPS instructions had been executed.
3. The translation process ensures IPS instructions read and write IPS memory exclusively. The OPS memory is inaccessible by IPS instructions and the translated set of OPS instructions cannot read or write OPS memory. As a result, the set of translated instructions will never be self-reading. The IPS instructions sandbox is the restricted memory space.

End-to-end encryption is impractical because of large number of communicating nodes in a Cloud framework because of the need to manage, store and recall large numbers of encryption keys. In the present method, we assume the number of computation nodes is N, we allocate the OPS to perform a hop-by-hop encryption with IPS nodes, in which each IPS subnode stores encryption keys shared with its immediate neighbors. Keys stored in OPS nodes include the keys shared with its neighbors and the IPS node which has keys shared with its subnodes and one key with the OPS. This method minimizes memory required for keys as well as the power consumption of transmitting keys.

Method Protocol
1. OPS clones encrypted IPS SMIRC+SDE instructions into OPS memory. The encrypted IPS decrypt in OPS memory. These instructions remain, therefore, out-of-band of the IPS and are not accessible by the IPS.
2. Decrypted IPS SMIRC+SDE instructions are translated (or interpreted) to a set of OPS instructions using a Van Wijngaarden grammar specified as a simple two-layer translator (see FIG. 4) of the target IPS.
3. The set of translated OPS instructions execute the state of the IPS and such that it appears as if the original IPS instructions had been executed. The translation process ensures IPS instructions never read decrypted IPS instructions.
4. The encrypted instructions are decrypted in OPS memory using OPS routines. The emulation sandbox ensures OPS memory is inaccessible by the IPS (i.e. decrypted instructions and decryption routines are out-of-band). The encrypted IPS executable does not have any decryption process and does not see the key needed to decrypt the instructions: decryption always stays out-of-band.
5. The translation mechanism of the OPS will re-write the instructions it has executed using the two level grammar into the IPS, which means the IPS never has the same image twice in a row and therefore the attack surface will never be the same twice.

Method: Key-CodeHash Pairing Whitelist
The encryption key itself is associated, using a simple hashmap to a hash (for example an MD5) of the subroutine or IPS code as the IPS code reciprocally has the OPS hash: this encoding defines an execution model that executes only paired signed OPS with IPS and IPS with its subnodes: therefore, unpaired unsigned malicious code such as rootkits and exploits will never be executed the principal reason is that the hash (example MD5) has to be recomputed each time a new translation is completed and this provides tamper evidence as well as tamper resistance.

Van Wijngaarden (VW) Grammar Rules
VW grammars are context-sensitive and therefore, for those skilled in art, can be used to write rules which transform one form of code (of, for example, an x86 instruction set) into another form while preserving its semantics which is its context's information. VW can define a long-range relation: this means that information flows contextually through the sentential form of the representation of the code (e.g. x86 assembler). When the VW is used in the context of the OPS and IPS then information must flow to the subnodes which look at their neighbors to rewrite one code form into another. Thus, using the VW grammar as a code translation engine implies that it requires almost all rules to know something about almost all the other rules which makes the attack surface very difficult.

The First Level Translator Grammar
The first level grammar generates the computer code. As a concrete example, the first level grammar for the x86 instruction set can be given using symbols S, T, U and V as:
S→mov eax, key T
T→xor [ebx], eax U
U→inc ebx V
This first level grammar generates the following executable instruction codes:
mov eax, key
xor [ebx], eax
inc ebx The codes are generated by the sequence of non-terminal symbols S→T→U→V. Specifically, a non-terminal such as S can be rewritten as "mov eax, key T", which can be again rewritten as "mov eax, key xor [ebx], eax U", etc . . . . The production rules defined can generate an equivalent sequence of instructions for arbitrary programs:

S→mov eax, key T|push key; pop eax T
T→xor [ebx], eax U|mov ecx, [ebx];
and ecx, eax; not ecx; or [ebx], eax;
and [ebx], ecx U
U→inc ebx V|add ebx, 1 V Similarly, code without any functional effect can be added to vary the IPS by the OPS. This can be done by adding a new non-terminal which generates "non-operational sequences" instructions with small overheads such as: S→G mov eax, key T|G push key; pop eax T These increase the number of instruction sequences that can be generated to increase the variance in the IPS and subnodes.

The Second-Level Translator Grammar

In the present patent, the method used is a random generator during the production process, to enable the production to randomly generate semantic and context preserving code sequences using the following VW metarules (to distinguish between metarules, the hyperrules, and the production rules, we change the usual Backus-Naur syntax '→' into ';' and :: for metarules and colon (':') for hyperrules. To separate the different alternatives of a rule we use semicolon ';' instead of '|'):

N :: 0; 1; 2; . . . ; 9; 0N; . . . 9N;
HEXIDECIMAL :: N; a; b; f; a HEXIDECIMAL; b HEXIDECIMAL; . . . ; f HEXIDECIMAL.
ADDRESS :: 0xN.
NUMBER :: MEMORY ADDRESS; HEXIDECIMAL.
INSTRUCTION :: mov; push; pop.
MEMORY REGISTER :: eax; ebx; edx.
STACK :: esp.
MEMORY REGISTERS :: STACK; REGISTER.
REGISTER NUMBER :: REGISTER; NUMBER.
MEMORY :: [REGISTER]; [ADDRESS].
TO :: ','.

In the following table we demonstrate in lay terms how Ontological Encryption functions independent of chip architecture because it is done at a binary level.

| Actual Instruction | Original Binary | Ontologically Encrypted Binary | Ontologically Encrypted Instruction |
|---|---|---|---|
| Add 2 to 2 | 01000001 01100100 01100100 00100000 00110010 00100000 01110100 01101111 00100000 00110010 | 01110011 01110101 01100010 01110100 01110010 01100001 01100011 01110100 00100000 00110011 00100000 01100110 01110010 01101111 01101101 00100000 00110011 | Subtract 3 from 3 |
| Compare eax to ebx | 01100011 01101111 01101101 01110000 01100101 01110010 01100101 00100000 01100101 01100001 01111000 00100000 01110100 01101111 00100000 01100101 01100010 01111000 | 01101101 01101111 01110110 01100101 00100000 00110011 00100000 01110100 01101111 00100000 00110010 | Move 3 to 2 |

The metanotion NUM represents an address or a hexadecimal number while INSTRUCTION represents several instructions, not just a single instruction (e.g. mov, push and pop). The following translations will modify an instruction into a readable and rewritable sentence that can be executed as equivalent to its subroutine given by the following hyperrules:

mov REGISTERS TO REGISTER NUMBER:
move REGISTER NUMBER in REGISTERS.
push REGISTER NUMBER:
save REGISTER NUMBER.
pop REGISTERS:
restore REGISTERS.

As a concrete example of a short subroutine, the codes "mov eax, 0" will be replaced by "move 0 in eax", because of the first hyperrule. To generate even higher complexity, we can add hyperrules which will transform codes into other equivalent codes:

move REGISTER NUMBER in MEMORY:
mov, MEMORY, TO, REGISTER NUMBER;
move REGISTER NUMBER in REGISTERS:
mov, REGISTERS, TO, REGISTER NUMBER;
save REGISTER NUMBER, restore REGISTERS.

For example, the codes obtained before ("move 0 in eax") can be revised into "mov, eax, ',', 0" or by "save 0, restore eax". The first alternative will halt the generation process. However, the codes "mov", "eax", "'", "'" and "0", where none of them match a left-hand side of a hyperrule will halt. However, other alternatives will continue generation, and both parts of the code, "save 0" and "restore eax", will be replaced independently from each other. Therefore, "save 0" can be replaced by "push, 0" or by "subtract 4 from esp, move 0 in [esp]", etc. The metarules defined above can be more extended by creating tables of equivalent instruction grammars for different processors (e.g. ARM, Intel, or other hardware) because they are performed through binary translation which means that the invention is not restricted to just one binary instruction chip architecture but may be used by any chip architecture (ARM, Intel or other hardware). The VW grammars can generate an infinite set of instructions for variability and so the hyperrules generate an infinite number of production rules: in practice, the amount is limited by setting a fixed counter on a per IPS basis to ensure diversity but also minimizing overheads of runtime. We call each of the VW generated target code sequences a "Stub".

The various subroutines of an IPS can each be defined by a separate VW grammar. Starting symbols of the grammar are themselves starting symbols of a grammar describing each program as a construction of stubs. The VW grammar produces a constructive method to generate those codes of the target machine CPU automatically. The OPS provides the whole operational program but the OPS itself can be redefined by the same process of the IPS. Thus a Van Wijngaarden grammar can be used to define IPS from the starting OPS which produces all the parts of the IPS, then the OPS can itself be translated via a runtime cloning or copying process: As an example, for a OPS with 4-level VW grammar definition where the parent, OPS, rewrites ongoingly is:

OPS:IPS-STUB01, IPS-STUB02, IPS-STUB03, IPS-STUB04
IPS-STUB01:VW-Grammar of STUB01 paired and signed to OPS-CHILD
IPS-STUB02:VW-Grammar of STUB02 paired and signed to OPS-CHILD
IPS-STUB03:VW-Grammar of STUB03 paired and signed to OPS-CHILD
IPS-STUB04:VW-Grammar of STUB04 paired and signed to OPS-CHILD
OPS-CHILD:OPS-CHILD paired and signed to OPS For instance, see Dick Grune, How to produce all sentences from a two-level grammar Information Processing Letters Volume 19, Issue 4, 12 Nov. 1984, Pages 181-185, incorporated herein by reference. Specifically, each stub is assigned to a different processor, for instance, in a cloud environment or some other computer system (described with reference to FIG. 5), to be processed and reported back to a supervising processor. In this way, adversaries are challenged to gather the entire code structure, and each time the code runs it will have different instruction sets, memory pointers, registers and data encryption.

Figure 3:
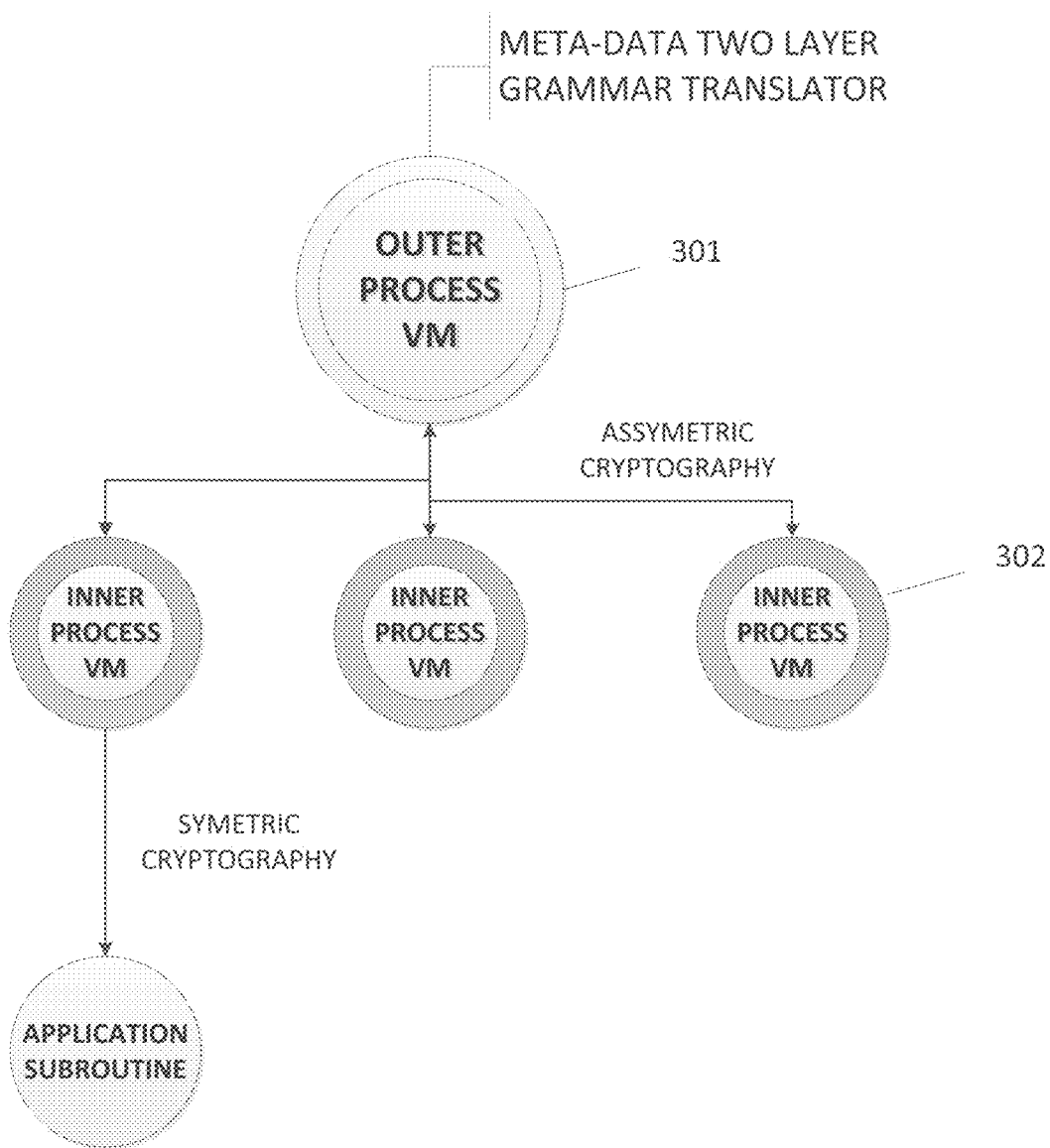
FIG. 3 illustrates one embodiment of the framework according the invention.

FIG. 3 illustrates an example of the processing system including a virtual machine (VM) that is composed of the Outer Processing System (OPS) (301), and an inner, guest part running in an Inner Processing System (IPS) (302) as is described above. The OPS 301 includes a meta-data two layer grammar translator. An asymmetric cryptography is applied for communication between OPS 301 and IPS 302. Furthermore, symmetric cryptography is used for communication between application subroutines.

FIG. 4 illustrates the process for randomizing instruction sets, memory registers, and pointers of a computing system. The execution VM that runs the STUB (to actually run the program) uses the randomly generated codes—in other words, the executing code always appears once, and then the codes leaves while the stack (part of the stub) remains for the next VM to continue the computation.

In step 1, the instructions are encrypted using the OP-Hash in the inner process. In step 2, the encrypted instructions are transmitted to the outer process. In step 3, the instructions are decrypted into the OPS memory and are executed by the VM that runs the STUB. These decrypted instructions remain out-of-band of the IPS and are not accessible by the IPS. The encrypted instructions are decrypted in OPS memory using OPS routines. The emulation sandbox ensures OPS memory is inaccessible by the IPS (i.e. decrypted instructions and decryption routines are out-of-band). The encrypted IPS executable does not have any decryption process and does not see the secret key needed to decrypt the instructions: decryption always stays out-of-band.

In step 4, the decrypted instructions are translated (or interpreted) to a set of OPS instructions using a Van Wijngaarden grammar specified as a simple two-layer translator of the target IPS. The set of translated OPS instructions execute the state of the IPS such that it appears as if the original IPS instructions had been executed. The translation process ensures IPS instructions never read decrypted IPS instructions.

In step 5, the translation mechanism of the OPS re-writes the instructions it has executed using the two level grammar into the IPS. This writing ensures that the IPS never has the same image twice in a row and therefore the attack surface will never be the same twice.

Note the entire process chain shown in FIG. 4 is not required for the system to operate. For instance, although the system goes through all of these steps in one embodiment, in a different embodiment steps may be switched around (reordered) or each and every step may not be required (some steps could be left out).

As stated previously, each of the functions of the above described embodiments may be implemented by one or more processing circuits. A processing circuit includes a programmed processor (for example, processor 503 in FIG. 5), as a processor includes circuitry. A processing circuit also includes devices such as an application-specific integrated circuit (ASIC) and conventional circuit components arranged to perform the recited functions. By one embodiment, the circuitry as described in FIG. 5, can be used to perform the randomization of the instruction sets, memory registers, and pointers to provide the security features described herein. Accordingly, the circuitry upon implementing the randomization process, can provide a secure framework to execute applications thereby improving the overall functionality of the computer.

Figure 5:
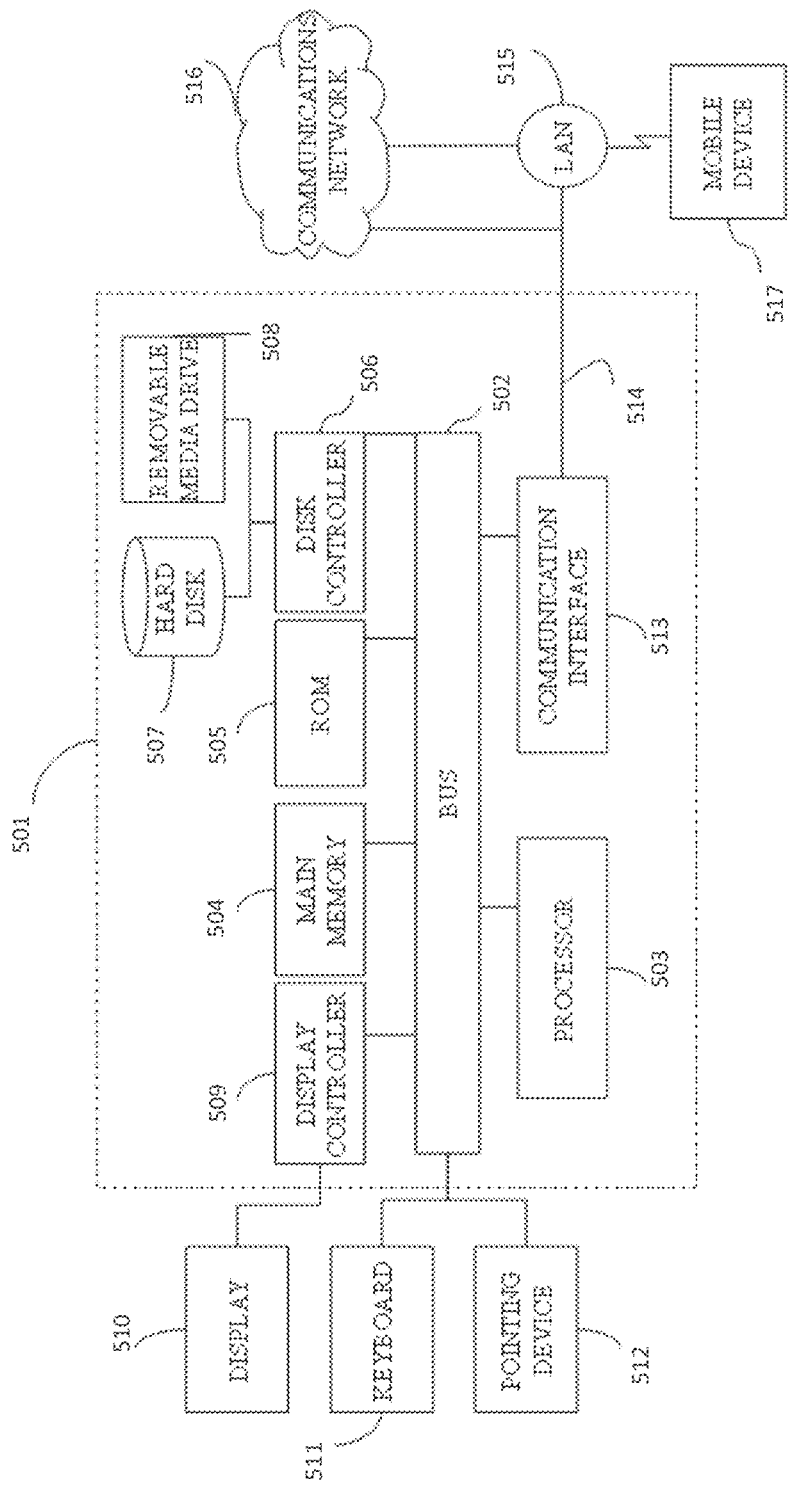
FIG. 5 illustrates a block diagram of a computing device according to one embodiment.

The various features discussed above may be implemented by a computing device such as a computer system (or programmable logic). The circuitry may be particularly designed or programmed to implement the above described functions and features which improve the processing of the circuitry and allow data to be processed in ways not possible by a human or even a general purpose computer lacking the features of the present embodiments. FIG. 5 illustrates such a computer system 501. The computer system 501 of FIG. 5 may be a particular, special-purpose machine. In one embodiment, the computer system 501 is a particular, special-purpose machine when the processor 503 is programmed to compute vector contractions.

The computer system 501 includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 501 may also include a display controller 509 coupled to the bus 502 to control a display 510, for displaying information to a computer user. The computer system includes input devices, such as a keyboard 511 and a pointing device 512, for interacting with a computer user and providing information to the processor 503. The pointing device 512, for example, may be a mouse, a trackball, a finger for a touch screen sensor, or a pointing stick for communicating direction information and command selections to the processor 503 and for controlling cursor movement on the display 510.

The processor 503 executes one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 501, for driving a device or devices for implementing the invention, and for enabling the computer system 501 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 503 for execution. A computer readable medium may take many forms, including but not limited to, non-volatile media or volatile media. Non-volatile media includes, for example, optical, magnetic disks, and magneto-optical disks, such as the hard disk 507 or the removable media drive 508. Volatile media includes dynamic memory, such as the main memory 504. Transmission media, on the contrary, includes coaxial cables, copper wire and fiber optics, including the wires that make up the bus 502. Transmission media also may also take the form of acoustic or light waves, such as those generated during radio wave and infrared data communications.

Various forms of computer readable media may be involved in carrying out one or more sequences of one or more instructions to processor 503 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 501 may receive the data on the telephone line and place the data on the bus 502. The bus 502 carries the data to the main memory 504, from which the processor 503 retrieves and executes the instructions. The instructions received by the main memory 504 may optionally be stored on storage device 507 or 508 either before or after execution by processor 503.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a network interface card to attach to any packet switched LAN. As another example, the communication interface 513 may be an integrated services digital network (ISDN) card. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

According to one embodiment there is described an method and apparatus for randomizing instructions to increase computer security. The process includes the steps of encrypting instructions in an inner processing system (IPS) of a processing system including a virtual machine (VM) that is composed of an outer processing system (OPS) and the IPS, transmitting the encrypted instructions to the outer processing system, decrypting the encrypted instructions at the OPS such that the decrypted instructions are out-of-band of the IPS and are not accessible by the IPS, executing the decrypted code via a stub routine in the virtual machine, translating the decrypted instructions to a set of OPS instructions using a Van Wijngaarden grammar specified as a simple two-layer translator for the IPS, and transmitting the translated instructions to the IPS.

While aspects of the present disclosure have been described in conjunction with the specific embodiments thereof that are proposed as examples, alternatives, modifications, and variations to the examples may be made. Furthermore, it should be noted that, as used in the specification and the appended claims, the singular forms "a," "an," and "the" include plural referents unless the context clearly dictates otherwise.

The invention claimed is:

1. A method for randomizing instructions to increase computer security, the method comprising:
encrypting instructions in an inner processing system (IPS) running on processing circuitry, the processing circuitry including an outer processing system (OPS) running thereon, access of the IPS to a memory being restricted to a first portion of the memory, and the OPS using at least a second portion of the memory, which is out-of-band and inaccessible by the IPS;

transmitting, from the IPS, the encrypted instructions to the OPS;

decrypting, by the OPS, the received encrypted instructions, the decrypted instructions being out-of-band and inaccessible by the IPS;

translating the decrypted instructions to a set of OPS instructions using a two-level grammar that obfuscates the decrypted instructions and decreases predictability of an instruction set of the OPS instructions; and executing the set of OPS instructions via a stub routine in a virtual machine (VM), which is not the IPS, wherein the VM, executing the set of OPS instructions, accesses data stored in the first portion of the memory, does not accesses data in the second portion of the memory, and realizes a same result as would be realized by the IPS executing the instructions in the IPS.

2. The method of claim 1, wherein the two-level grammar is a Van Wijngaarden grammar.

3. The method of claim 2, further comprising:
generating randomly, based on the Van Wijngaarden grammar, memory registers and pointers for the VM.

4. The method of claim 1, further comprising:
creating, by the OPS, a semantic dictionary encryption based on a symmetric encryption algorithm.

5. The method of claim 1, wherein the stub routine is included in the OPS and the encryption performed by the IPS is an asymmetric encryption.

6. The method of claim 5, wherein the asymmetric encryption is one of a RSA encryption and an elliptic curve cryptography (ECC) encryption.

7. The method of claim 4, wherein the symmetric encryption algorithm is one of RC4, RC5, SHA-1, and MD5 algorithm.

8. The method of claim 1, further comprising:
transmitting, by the OPS, the executed instruction to another virtual machine, the another virtual machine being an immediate successor of the VM in a hierarchy of virtual machines.

9. The method of claim 8, wherein each virtual machine in the hierarchy of virtual machines is provided a part of the decrypted instructions that has been translated using a unique two-level grammar.

10. The method of claim 8, wherein a total number of virtual machines included in the hierarchy of virtual machines is randomly selected during application execution.

11. The method of claim 10, further comprising:
generating a random number of additional virtual machines to be included in the hierarchy of virtual machines, the additional number of virtual machines being generated based on a uniform random distribution.

12. A non-transitory computer readable medium having stored thereon a program that when executed by a computer causes the computer to execute a method for randomizing instructions to increase computer security, the method comprising:

encrypting instructions in an inner processing system (IPS) that accesses only a first portion of a memory;

transmitting, from the IPS, the encrypted instructions to an outer processing system (OPS), the OPS using at least a second portion of the memory, which is out-of-band and inaccessible by the IPS;

decrypting, by the OPS, the received encrypted instructions, the decrypted instructions being out-of-band and inaccessible by the IPS;

translating the decrypted instructions to a set of OPS instructions using a two-level grammar that obfuscates the decrypted instructions and decreases predictability of an instruction set of the OPS instructions; and executing the set of OPS instructions via a stub routine in a virtual machine (VM), which is not the IPS, wherein the VM, executing the set of OPS instructions, accesses data stored in the first portion of the memory, does not accesses data in the second portion of the memory, and realizes a same result as would be realized by the IPS executing the instructions in the IPS.

13. The non-transitory computer readable medium of claim 12, wherein the two-level grammar is a Van Wijngaarden grammar.

14. The non-transitory computer readable medium of claim 13, wherein the method further comprises:
generating randomly, based on the Van Wijngaarden grammar, memory registers and pointers for the VM.

15. The non-transitory computer readable medium of claim 12, wherein the method further comprises:
creating, by the OPS, a semantic dictionary encryption based on a symmetric encryption algorithm.

16. The non-transitory computer readable medium of claim 12, wherein the stub routine is included in the OPS and the encryption performed by the IPS is an asymmetric encryption.

17. The non-transitory computer readable medium of claim 16, wherein the asymmetric encryption is one of a RSA encryption and an elliptic curve cryptography (ECC) encryption.

18. The non-transitory computer readable medium of claim 15, wherein the symmetric encryption algorithm is one of RC4, RC5, SHA-1, and MD5 algorithm.

19. The non-transitory computer readable medium of claim 12, wherein the method further comprises:
transmitting, by the OPS, the executed instruction to another virtual machine, the another virtual machine being an immediate successor of the VM in a hierarchy of virtual machines.

20. The non-transitory computer readable medium of claim 19, wherein each virtual machine in the hierarchy of virtual machines is provided a part of the decrypted instructions that has been translated using a unique two-level grammar.

21. The non-transitory computer readable medium of claim 15, wherein a total number of virtual machines included in the hierarchy of virtual machines is randomly selected during application execution.

22. The non-transitory computer readable medium of claim 21, wherein the method further comprises:
generating a random number of additional virtual machines to be included in the hierarchy of virtual machines, the additional number of virtual machines being generated based on a uniform random distribution.

23. An apparatus for randomizing instructions to increase computer security, comprising:
memory including
a first portion that is accessible to an inner processing system (IPS), and
a second portion that is used by an outer processing system (OPS) and is out-of-band and inaccessible by the IPS; and
circuitry running the IPS and the OPS configured to
encrypt instructions in the IPS,
transmit, from the IPS, the encrypted instructions to the OPS, decrypt, by the OPS, the received encrypted instructions, the decrypted instructions being out-of-band and inaccessible by the IPS, translate the decrypted instructions to a set of OPS instructions using a context two-level grammar that obfuscates the decrypted instructions and decreases predictability of an instruction set of the OPS instructions, and execute the set of OPS instructions via a stub routine in a virtual machine (VM), which is not the IPS, wherein the VM, executing the set of OPS instructions, accesses data stored in the first portion of the memory, does not accesses data in the second portion of the memory, and realizes a same result as would be realized by the IPS executing the instructions in the IPS.

24. The apparatus of claim 23, wherein the two-level grammar is a Van Wijngaarden grammar.

25. The apparatus of claim 24, wherein the circuitry is further configured to generate randomly, based on the Van Wijngaarden grammar, memory registers and pointers for the VM.

26. The apparatus of claim 23, wherein the circuitry is further configured to create, by the OPS, a semantic dictionary encryption based on a symmetric encryption algorithm.

27. The apparatus of claim 23, wherein the stub routine is included in the OPS and the encryption performed by the IPS is an asymmetric encryption.

28. The apparatus of claim 27, wherein the asymmetric encryption is one of a RSA encryption and an elliptic curve cryptography (ECC) encryption.

29. The apparatus of claim 26, wherein the symmetric encryption algorithm is one of RC4, RC5, SHA-1, and MI5 algorithm.

30. The apparatus of claim 23, wherein the circuitry is further configured to transmit, by the OPS, the executed instruction to another virtual machine, the another virtual machine being an immediate successor of the VM in a hierarchy of virtual machines.

31. The apparatus of claim 30, wherein each virtual machine in the hierarchy of virtual machines is provided a part of the decrypted instructions that has been translated using a unique two-level grammar.

32. The apparatus of claim 26, wherein a total number of virtual machines included in the hierarchy of virtual machines is randomly selected during application execution.

33. The apparatus of claim 32, wherein the method further comprises:

generating a random number of additional virtual machines to be included in the hierarchy of virtual machines, the additional number of virtual machines being generated based on a uniform random distribution.

* * * * *